United States Patent [19]
Tanzilli et al.

[11] 3,890,268

[45] June 17, 1975

[54] WEATHER RESISTANT POLYVINYL CHLORIDE COMPOUNDS AND METHOD OF MAKING SAME

[75] Inventors: James D. Tanzilli, Avon Lake; Arthur F. Korney, Rocky River, both of Ohio

[73] Assignee: The B. F. Goodrich Company, Akron, Ohio

[22] Filed: Sept. 7, 1973

[21] Appl. No.: 395,225

[52] U.S. Cl. ...... 260/42.29; 106/300; 260/29.6 RB; 260/29.6 MM; 260/29.7 UA; 260/29.7 M; 260/42.49
[51] Int. Cl. ............................................ C08f 45/04
[58] Field of Search ...... 260/42.49, 42.29, 29.6 RB, 260/29.6 MM, 29.7 UA, 29.7 M; 106/300

[56] References Cited
UNITED STATES PATENTS

| | | | |
|---|---|---|---|
| 3,065,093 | 11/1962 | Berstein et al. | 106/300 |
| 3,423,346 | 1/1969 | Klauss et al. | 260/42.49 |
| 3,632,679 | 1/1972 | De Witt | 260/879 |
| 3,644,576 | 2/1972 | Sehm | 260/876 |
| 3,760,035 | 9/1973 | Kelley | 260/876 R |

*Primary Examiner*—James H. Derrington
*Attorney, Agent, or Firm*—J. Hughes Powell, Jr.

[57] ABSTRACT

Improved weather-resistant building products, such as house siding and the like, are made from vinyl chloride polymers containing both rutile and anatase titanium dioxide. Said compounds are rigid, high impact compounds having improved color retention, impact retention and resistance to dirt accumulation and fungus growth after weathering exposure.

10 Claims, No Drawings

WEATHER RESISTANT POLYVINYL CHLORIDE COMPOUNDS AND METHOD OF MAKING SAME

BACKGROUND OF THE INVENTION

It is well known to employ vinyl chloride polymers, copolymers and blends such as those described hereinafter in making building materials such as house siding and the like. However, outdoor exposure to sunlight and consequent environmental weathering of rigid vinyl chloride polymeric compound products results in appearance changes with time which are aesthetically undesirable and also results in reduced impact strength. Especially undesirable in white, rigid vinyl chloride polymeric compounds are dirt accumulation, yellowing discloration, fungus growth and concurrent reduced impact strength.

Anatase titanium dioxides, having a refractive index of about 2.55, impart high reflectivity and high opacity to vinyl chloride polymers into which they are incorporated. The initial color of polymers containing anatase is good, but light resistance is inadequate for prolonged exposure to outdoor weathering. Upon outdoor exposure, the polymer at the surface of the product degrades, resulting in the phenomenon known as "chalking" and concurrent reduced impact strength. Moreover, white products tend to yellow, accumulate dirt, and support fungus growth. Application of coating such as inorganic oxides and the like to anatase increases resistance to yellowing, but products containing such coated anatase pigments still chalk upon outdoor exposure and are not used for outdoor exposure applications.

Rutile titanium dioxides, having a refractive index of about 2.7, and consequently even higher reflectivity and opacity than anatase pigments, impart much more resistance to light, and yellowing and chalking are reduced greatly. Rutile titanium dioxides are commonly used for outdoor exposure applications. Nevertheless, this resistance is still not fully satisfactory for the intense sunlight exposure experienced in locations such as Arizona and the like and for the wetness and mildew growth promoted by warm weather in areas such as the Gulf coast and the like.

Furthermore, fungicides which may function well in plasticized vinyl chloride polymers and copolymers are generally ineffective in rigid, unplasticized vinyl chloride polymers. A rigid vinyl chloride polymeric building product compound is desired having improved color retention, impact retention and resistance to dirt accumulation and fungus growth after outdoor weathering exposure.

SUMMARY OF THE INVENTION

It has been found that the use of both rutile titanium dioxide and anatase titanium dioxide in the defined amounts in vinyl chloride polymers described hereinafter results in rigid, high impact compounds having improved color retention, impact retention and resistance to dirt accumulation and fungus growth over compounds incorporating rutile titanium dioxide alone and having less chalking than anatase titanium dioxide alone. Moreover, a cost savings results, since anatase is less expensive than rutile.

DETAILED DESCRIPTION

Titanium dioxides suitable for use in this invention have a particle size of from about 0.1 micron to about 1.0 micron, more preferably from about 0.1 micron to about 0.4 micron. A typical medium particle diameter of titanium dioxide pigment is about 0.2 micron. Particle size and particle size distribution can be optimized to contribute, together with high refractive index, to efficient light scattering and consequent high reflectance, whiteness and hiding power, as is known to those skilled in the art. Titanium dioxide particles may also contain on the surface alumina, silica, zinc oxide, other agents known to those skilled in the art, or combinations thereof to form stable and easily processable products. Anatase titanium dioxides suitable for use in this invention may contain from 0 to about 5% by weight and more of said agents, more preferably from 0 to about 3% by weight of said agents.

Titanium dioxide is used in the improved weather stable products of this invention at a total level of from about 5 parts to about 20 parts per hundred parts of vinyl chloride resin, more preferably about 15 parts. The anatase form of titanium dioxide comprises from about 10% to about 60% of said total level, more preferably from about 20% to about 50% of said total level, with the remaining titanium dioxide being the rutile form.

Vinyl chloride polymeric materials suitable for use in this invention include homopolymers, copolymers and blends of homopolymers and/or copolymers. Particularly suitable are blends of at least one tough, rubbery, essentially completely insoluble (gelled) alkyl acrylate polymer and at least one hard, unplasticized vinyl chloride resin in which a very small proportion of the rubbery polymer is uniformly dispersed as a more or less continuous network to form superior high impact rigid resin formulations.

The vinyl chloride polymers may contain from 0 up to about 20% by weight of one or more other monovinylidene monomers (i.e., a monomer containing a single terminal $CH_2 = C<$ group per molecule), more preferably, not more than about 10% by weight of such monomers. Such other monomers include 1-olefins having from 2 to 8 and more preferably from 2 to 4 carbon atoms, such as ethylene, propylene, 1-butene, 1-hexene, 2-ethylhexene-1 and the like. Alkyl acrylates may be used wherein the alkyl group contains from 1 to 10 carbon atoms and more preferably from 2 to 8 carbon atoms, such as methyl acrylate, ethyl acrylate and the like, preferably gelled to less than 20%/wt. solubility in toluene. Other monovinylidene monomers such as styrene, acrylonitrile, acrylamides, vinyl acetate, vinylidene chloride and the like may also be used. A polymer containing one or more of said alkyl acrylates at a level up to about 65%/wt. may be diluted in any convenient manner with a vinyl chloride polymer not containing an alkyl acrylate phase to produce a final blend having an alkyl acrylate content of less than about 20%/wt., more preferably less than about 10%/wt.

The vinyl chloride polymeric materials of this invention have an inherent viscosity (measured using 0.2 gram of resin in 100 ml. of cyclohexanone at 30°C by ASTM D1243) of from about 0.45 to about 1.2, in particular from about 0.45 to about 0.75 for injection molding grade polymers and from about 0.75 to about 1.2 and, more preferably, from about 0.85 to about 1.2 for extrusion grade polymers.

Especially useful vinyl chloride compositions contain a crosslinked rubbery acrylate polymer. A gelled polyacrylate may be mixed with a vinyl chloride base resin and subjected to intense mechanical shear to effect fusion into an integral mass and proper dispersion of the gelled polyacrylate as described in U.S. Pat. No. 3,644,576 (incorporated herein by reference). For example, the vinyl chloride polymer is generally a blend of (1) a thermoplastic vinyl chloride resin free of plasticizer and selected from the group consisting of polyvinyl chloride and copolymers of vinyl chloride and propylene containing from about 0.5 to about 10%/wt. of combined propylene and (2) a rubbery, essentially completely gelled polymer of a monomeric mixture free of conjugated unsaturation and comprising at least about 80% by weight of an alkyl acrylate in which the alkyl group contains from 2 to 4 carbon atoms, up to about 19.5% by weight of a monomer copolymerizable with said alkyl acrylate and containing a single $CH_2 = C <$ group per molecule, and from about 0.5 to about 8% by weight of a gel-inducing monomer copolymerizable with said alkyl acrylate. Said gel-inducing monomer is selected from the class consisting of (a) a monomeric acrylic polyester of a polyhydric alcohol and of an acrylic acid selected from the class consisting of acrylic and methacrylic acids and containing from 2 to 6 acrylic ester groups per polyester molecule and (b) a polyalkenyl polyether of a polyhydric alcohol containing from 2 to 6 alkenyl ether groups per molecule and in which the said alkenyl ether groups are each present in the stucture $CH_2 = C <$. Said acrylate polymer evidences a solubility in toluene at room temperature to the extent of less than 20%/wt. and is present in said blend as dispersed particles of average diameter between about 500 and about 8000 A. Said thermoplastic resin exhibits an inherent viscosity as determined at 30°C. according to ASTM D1243, employing 0.2 gram resin in 100 ml of cyclohexanone, if polyvinyl chloride of between 0.45 and 1.20, and, if a copolymer of vinyl chloride and propylene of between .55 and 11.60. Said blend contains as polymeric ingredients from about 2% to about 20% by weight of said gelled acrylate polymer and from about 80% to about 98% by weight of said vinyl chloride resin.

Alternatively, a gelled polyacrylate may be subjected to a one-step overpolymerization by vinyl chloride as described in U.S. Pat. No. 3,632,679 (incorporated herein by reference). For example, the final polymer generally comprises macro-granules produced by polymerization in aqueous suspension. The granules consist of a (1) matrix of a hard, thermoplastic vinyl chloride resin selected from the class consisting of polyvinyl chloride and copolymers of from about 93% to about 99%/wt. of combined vinyl chloride and from about 1 to about 7%/wt. of combined propylene and (2) particles from about 1500 to about 8000 A in average diameter dispersed uniformly in said matrix and consisting of a tough, rubbery, essentially completely-gelled copolymer of a monomeric material consisting of (a) an alkyl acrylate in which the alkyl group contains from 2 to 4 carbon atoms and (b) from about 1% to about 4%/wt. of a monomeric acrylic polyester of a polyalkylene glycol and of acrylic acid containing from 2 to 6 acrylate ester groups per polyester molecule. Said rubbery copolymer exhibits a solubility in toluene at room temperature below about 10%/wt. and constitutes from about 5 to about 20%/wt. of the composite product. Said composite resinous polymerization product is a rigid material possessed of high resistance to impact.

A gelled polyacrylate may also be overpolymerized upon a vinyl chloride seed resin and the resulting material subjected to a second-step overpolymerization by vinyl chloride. The overpolymerization process and product are the subject of an application of Philip C. Kelley, Ser. No. 142,524 filed May 12, 1971, now U.S. Pat. No. 3,760,035 (incorporated herein by reference).

Said two-step overpolymerization process described briefly hereinabove comprises the following procedure:

1. a vinyl chloride latex seed resin is prepared having particles from about 200 A to about 1250 A in average diameter (as determined by means of a soap titration procedure) by polymerizing in an aqueous dispersion containing one or more water-soluble dispersants, a monomeric material consisting of liquid monomeric vinyl chloride, optionally not more than about 20%/wt. of said total monomeric material of one or more monovinylidene monomers copolymerizable in aqueous dispersion with vinyl chloride, and optionally, from about 0.25% to about 5%/wt. of a crosslinking monomer free of conjugated unsaturation and containing at least two $CH_2 = C <$ groups per molecule which demonstrate different reactivities in polymerization with vinyl chloride.

2. Said vinyl chloride latex seed resin is combined with
   a. a monomeric mixture free of conjugated unsaturation and consisting of (i) at least 80%/wt. of an alkyl acrylate in which the alkyl groups contain from 2 to 8 carbon atoms, (ii) not more than a total of 19.5%/wt. of one or more monovinylidene monomers copolymerizable in aqueous dispersion with said alkyl acrylate, and (iii) from about 0.5% to about 8%/wt. of a crosslinking monomer containing at least two $CH_2 = C <$ groups per molecule;
   b. selected polymerization adjuvents, if necessary, including a water-soluble peroxygen catalyst and one or more of said water-soluble dispersants both in proportions to effect polymerization of said monomeric mixture (a) in aqueous dispersion on said seed resin particles without significant new polymer particle initiation, and (c) water, if required. The resulting aqueous dispersion medium contains no significant proportions of chain-terminating polymerization modifiers. Polymerization of said monomeric mixture (a) is effected in said medium to form a latex product in which the original seed resin latex particles are coated with a shell of the resulting rubbery gelled acrylate copolymer ranging from about 50 A to about 500 A in thickness as determined by calculation based on a soap titration procedure, the said rubbery acrylate copolymer of said shell being soluble in toluene at room temperature to the extent of less than about 20%/wt. as determined by an ultra-centrifuge procedure. The material of said shell constitutes from about 12% to about 99.7%/wt. of the total weight of said coated particles.

3. Said step (2) rubber-coated latex particles are combined with
   a. a monomeric material consisting of liquid monomeric vinyl chloride and mot more than a total of 10%/wt. of one or more monovinylidene monomers copolymerizable with vinyl chloride in aqueous suspension, and, if necessary,
   b. a peroxygen polymerization catalyst,
   c. a polymerization suspension or dispersing agent, and (d) water.

4. Polymerization of said step (3) (a) monomeric material is effected in the resulting aqueous medium to produce a polymeric product containing said rubbery acrylate coated latex particles encased in a matrix of hard, vinyl chloride resin, said last-named polymeric product containing from about 3 to about 65%/wt. of its total weight of said rubbery, gelled acrylate copolymer.

As indicated above, the macrogranular product obtained in the second overpolymerization will contain from about 3% to about 65%/wt. of the polyacrylate ingredient; more usually, this amount is from about 10% to about 40%/wt. of the polyacrylate ingredient. Such second overpolymerization product can be diluted in any convenient manner with vinyl chloride resin not having a rubbery polyacrylate phase to produce a final blend having an average concentration of polyacrylate from about 3 to about 6 phr. Such final granular blend may be fluxed, fused and masticated to homogeneity under fairly intensive shear in or on a mixer apparatus having its metal surfaces in contact with the plastic maintained at a temperature somewhat above what has been the practice with most rigid vinyl chloride resins, i.e., between about 350° and 440°F., more preferably between about 375° and 420°F. Stock temperatures will usually be slightly higher than this during such mechanical working.

The vinyl chloride polymer formulations of this invention may contain minor proportions of other ingredients such as fillers, stabilizers, opacifiers, lubricants, processing aids, impact modifying resins, antioxidants, and others. Colorants are not generally used because of the tendency to chalk and therefore fade imparted by anatase.

The weathering program included exposures of 6 inch by 6 inch panels, 30 mils or 50 mils thick, at 45° elevation facing south, unbacked, in Arizona, Florida, Ohio and Louisiana for periods of 6, 12, 18 and 24 months at each location. Test evaluations included the Variable Height Impact Test (VHIT) for impact retention and visual examination for yellowing in Arizona, Florida, Ohio and Louisiana. Additional evaluations of fungus growth resistance, dirt accumulation resistance and general appearance were made in Louisiana.

The Variable Height Impact Test is described by R. C. Neuman in Polymer Engineering and Science, Vol. 6, No. 2 pp. 124 – 127 (1966). The test is also described in National Bureau of Standards Voluntary Product Standard PS 55-72, pp. 4 – 5. The test is believed to yield more meaningful weatherability data than a variety of other test methods used heretofore. A 6-inch by 6-inch plastic panel, 30 mils or 50 mils thick, described heretofore, is used for testing. The testing equipment consists of a forty-inch long vertical graduated tube which guides a weight dropped against a one-half-inch diameter hammer from varying heights. The hammer rests its hemispherical head upon the specimen lying upon an annular pedestal. The weight strikes the hammer, driving the one-half-inch diameter head through the specimen and into a 0.640 inch hole in the pedestal. Potential energy in inch-pounds is read directly from calibration marks on the graduated tube. An "$F_{50}$" (value at which 50% of the samples fail) calculation is made as described by Neuman in units of inch-pounds/30 or 50 mils or in inch-pounds/mil. Variable Height Impact Test values after outdoor sample exposure are reported as percentages of unexposed sample test values.

Visual evaluation for color retention, i.e., a lack of yellowing in white building products, was made by averaging the ratings of a given sample by a minimum of 3 people. Visual evaluations for fungus growth resistance, dirt accumulation resistance and general appearance were made by averaging the ratings of a given sample on a scale of 1 to 10 as follows:

10 - perfect; no breakdown;
8 - trace of breakdown;
6 - slight breakdown;
4 - moderate breakdown;
2 - pronounced breakdown;
1 - complete breakdown.

As indicated heretofore, compounds of the present invention have generally improved color retention, impact retention and resistance to dirt accumulation and fungus growth after outdoor weathering exposure. Said compounds are useful in extruding and/or injection molding a variety of building products such as house siding, rain gutters and downspouts and the like, particularly when said compounds will be exposed to severe weather conditions of heat and moisture.

The following examples are intended to illustrate the present invention more fully.

EXAMPLE 1

A resin prepared as described heretofore was powder mixed with an added polyvinyl chloride diluent resin and compounding materials as follows:

TABLE 1

| Materials, parts/wt. | A | B | C |
|---|---|---|---|
| Polyvinyl Chloride (1) | 53.5 | 53.5 | 53.5 |
| Vinyl Chloride Polymer (2) | 51.5 | 51.5 | 51.5 |
| Tin Stabilizer | 2.5 | 2.5 | 2.5 |
| Calcium Stearate | 1.75 | 1.75 | 1.75 |
| Wax Lubricant | 1.75 | 1.75 | 1.75 |
| Rutile TiO$_2$ | 15 | 11 | 9 |
| Anatase TiO$_2$ | 0 | 4 | 6 |

(1) Inherent Viscosity of about 0.90 – 0.94; ASTM classification GP-4-16043.
(2) Produced by the two-step overpolymerization process described heretofore at page 7 and diluted with polyvinyl chloride as shown to about 5%/wt. of poly-n-butyl acrylate in the final compound; inherent viscosity of about 0.96 – 1.00.

The powder mix was extruded into house siding and the siding cut into 6 inch × 6 inch panels which were tested, exposed outdoors and retested as described heretofore. Test results show generally improved Variable Height Impact Test (VHIT) retention, reduced yellowing, reduced dirt accumulation, reduced fungus growth and improved general appearance with partial replacement or rutile by anatase.

TABLE 2

| | | SAMPLES | |
|---|---|---|---|
| | A | B | C |
| Properties: | | | |
| Original VHIT, inch lbs/50 mils | 163 | 144 | 158 |
| ARIZONA | | | |
| 1 Yr Retained VHIT | 23% | 100% | 100% |
| 1 Yr Color | Much Change — Fail — Yellowed | Slight Change — Yellowed | Moderate Change — Yellowed |
| 2 Yrs Retained VHIT | 9% | 81% | 68% |
| 2 Yrs Color | Much Change — Fail — Yellowed | Moderate Change — Yellowed | Moderate Change — Yellowed |

TABLE 2—Continued

|  |  | SAMPLES |  |  |
|---|---|---|---|---|
|  |  | A | B | C |
| Properties: |  |  |  |  |
| Original VHIT, inch lbs/50 mils |  | 163 | 144 | 158 |
| FLORIDA |  |  |  |  |
| 1 Yr | Retained VHIT | 90% | 100% | 100% |
| 1 Yr | Color | Slight Change — Yellowed | Slight Change — Yellowed | Slight Change — Yellowed |
| 2 Yrs | Retained VHIT | 87% | 100% | 100% |
| 2 Yrs | Color | Moderate Change — Yellowed | Slight Change — Yellowed | Slight Change — Yellowed |
| OHIO |  |  |  |  |
| 1 Yr | Retained VHIT | 98% | 100% | 100% |
| 1 Yr | Color | Moderate Change — Darkened | Moderate Change — Darkened | Slight Change — Darkened |
| 2 Yrs | Retained VHIT | 87% | 100% | 100% |
| 2 Yrs | Color | Moderate Change — Yellow — Slightly Dirty | No Change | No Change |
| LOUISIANA |  |  |  |  |
| 1 Yr | Retained VHIT | 98% | 100% | 100% |
| 1 Yr | Color | Much Change — Fail Speckled | Slight Change — Whiter | Slight Change — Whiter |
| 1 Yr | —Fungus | 2 | 8 | 8 |
|  | —Dirt | 8 | 8 | 8 |
|  | —General Appearance | 2 | 8 | 8 |
| 2 Yrs | Retained VHIT | 100% | 100% | 100% |
| 2 Yrs | Color | Moderate Change — Darkened | No Change | Slight Change — Whiter |
| 2 Yrs | —Fungus | 4 | 8 | 9 |
|  | —Dirt | 4 | 8 | 9 |
|  | —General Appearance | 4 | 8 | 9 |

EXAMPLE II

A vinyl chloride homopolymer resin was powder mixed with processing aid and other compounding materials as follows:

TABLE 3

| Material, Parts/Wt. | D | E | F |
|---|---|---|---|
| Polyvinyl Chloride (1) | 100 | 100 | 100 |
| 75/25 Styrene-acrylonitrile Copolymer | 3 | 3 | 3 |
| Tin Stabilizer | 2 | 2 | 2 |
| Calcium Stearate | 2 | 2 | 2 |
| Wax Lubricant | 2 | 2 | 2 |
| Rutile TiO$_2$ | 15 | 11 | 9 |
| Anatase TiO$_2$ | 0 | 4 | 6 |

(1) Polymer, easy-processing variety; inherent viscosity of about 1.10 – 1.16; ASTM classification GP-6-15443.

The powder mix was extruded into house siding and the siding cut into 6 inch × 6 inch panels which were tested, exposed outdoors and retested as described heretofore. Test results are best for the highest level of anatase (designated heretofore as more preferred).

TABLE 4

|  |  | SAMPLES |  |  |
|---|---|---|---|---|
|  |  | D | E | F |
| Properties |  |  |  |  |
| Original inch lbs/50 mils |  | 184 | 186 | 187 |
| ARIZONA |  |  |  |  |
| 1 Yr | Retained VHIT | 35% | 34% | 56% |
| 1 Yr | Color | Much Change — Fail Yellowed | Moderate Change — Yellowed | Moderate Change — Yellowed |
| 2 Yrs | Retained VHIT | 12% | 12% | 16% |
| 2 Yrs | Color | Much Change — Fail Yellowed | Moderate Change — Yellowed | Moderate Change — Yellowed |
| LOUISIANA |  |  |  |  |
| 1 Yr | Retained VHIT | 100% | 96% | 100% |
| 1 Yr | Color | Moderate Change — Darkened — Speckled | Slight Change — Darkened | No Change |
| 1 Yr | —Fungus | 2 | 8 | 8 |
|  | —Dirt | 8 | 7 | 7 |
|  | —General Appearance | 2 | 8 | 8 |
| 2 Yrs | Retained VHIT | 73% | 43% | 49% |
| 2 Yrs | Color | Much Change — Fail Speckled | Slight Change — Whitened | Slight Change — Whitened |
| 2 Yrs | —Fungus | 3 | 8 | 8 |
|  | —Dirt | 3 | 8 | 8 |
|  | —General Appearance | 3 | 8 | 8 |

EXAMPLE III

A vinyl chloride homopolymer resin was powder mixed with a processing aid, an impact modifying resin, and other compounding materials as follows:

TABLE 5

| Material, Parts/wt. | G | H |
|---|---|---|
| Polyvinyl chloride (1) | 100 | 100 |
| 75/25 Styrene-acrylonitrile Copolymer | 2 | 2 |
| Tin Stabilizer | 2 | 2 |
| Chlorinated Polyethylene | 8 | 8 |
| Calcium Stearate | 2 | 2 |
| Wax Lubricant | 2 | 2 |
| Rutile $TiO_2$ | 15 | 9 |
| Anatase $TiO_2$ | 0 | 6 |

(1) Inherent viscosity of about 1.10 – 1.16; ASTM classification GP-6-15443.

The powder mix was extruded into house siding and the siding cut into 6 inch × 6 inch panels which were tested, exposed outdoors and retested as described heretofore. Test results show generally improved Variable Height Impact Test (VHIT) retention, and reduced dirt accumulation, and reduced fungus growth with partial replacement of rutile by anatase.

TABLE 6

| Properties | SAMPLES | |
|---|---|---|
| | G | H |
| Original VHIT, inch lbs/50 mils | 82 | 102 |
| ARIZONA | | |
| 6 mos Retained VHIT | 42% | 49% |
| 6 mos Color | Slight Change — Whiter | Slight Change — Whiter |
| 6 mos Dirt and Fungus | None | None |
| 1 Yr Retained VHIT | 24% | 51% |
| 1 Yr Color | Slight Change — Whiter | Slight Change — Whiter |
| 1 Yr Dirt and Fungus | Slight | Slight |
| FLORIDA | | |
| 6 mos Retained VHIT | 39% | 63% |
| 6 mos Color | Slight Change — Whiter | Slight Change - Whiter |
| 6 mos Dirt and Fungus | Moderate | None |
| 1 Yr Retained VHT | 18% | 29% |
| 1 Yr Color | Moderate Change — Whiter | Moderate Change - Whiter |
| 1 Yr Dirt and Fungus | Moderate | None |
| OHIO | | |
| 6 mos Retained VHIT | 44% | 75% |
| 6 mos Color | Slight Change - Whiter | Slight Change — Whiter |
| 6 mos Dirt and Fungus | Slight | Slight |
| 1 Yr Retained VHIT | 36% | 92% |
| 1 Yr Color | Slight Change - Whiter | Slight Change — Whiter |
| 1 Yr Dirt and Fungus | Moderate | Slight |
| LOUISIANA | | |
| 6 mos Retained VHIT | 26% | 79% |
| 6 mos Color | Slight Change - Whiter | Slight Change — Whiter |
| 6 mos Dirt and Fungus | Moderate | None |
| 1 Yr Retained VHIT | 22% | 57% |
| 1 Yr Color | Slight Change - Whiter | Slight Change — Whiter |
| 1 Yr Dirt and Fungus | Slight | None |

What is claimed is:

1. A rigid vinyl chloride polymeric composition having improved weathering characteristics comprising a vinyl chloride polymer and about 5 to 20 weight parts of titanium dioxide per 100 weight parts of vinyl chloride polymer wherein said titanium dioxide contains about 10 to 60% by weight anatase titanium dioxide and about 40 to 90% by weight rutile titanium dioxide.

2. A composition of claim 1 wherein the vinyl chloride polymer contains up to about 20% by weight of at least one other vinylidene monomer containing a terminal $CH_2=C<$ group copolymerized therewith.

3. A composition of claim 2 wherein said vinylidene monomer is selected from the group consisting of $\alpha$-olefins containing 2 to 8 carbon atoms and alkyl acrylates wherein the alkyl group contains 1 to 10 carbon atoms.

4. A composition of claim 1 wherein said vinyl chloride polymer contains a crosslinked polymer of an alkyl acrylate.

5. The composition of claim 4 wherein said alkyl acrylate polymer is a polymer containing more than 50% by weight of an alkyl acrylate wherein the alkyl group contains 2 to 8 carbon atoms and up to 50% by weight of at least one other vinylidene monomer having a terminal $CH_2=C<$ grouping, said polymer being substantially insoluble in toluene.

6. A composition of claim 5 wherein said vinyl chloride polymer is selected from the group consisting of polyvinyl chloride and copolymers of vinyl chloride and propylene containing up to about 10% by weight of propylene and the acrylate polymer is a rubbery copolymer of an alkyl acrylate wherein the alkyl group contains 2 to 4 carbon atoms and up to about 20% by weight of at least one vinylidene monomer copolymerizable therewith and about 0.1 to 10% by weight of a gel inducing monomer, and said copolymer is present in amounts of about 1 to 65 weight percent of the composition.

7. A composition of claim 6 wherein the vinyl chloride polymer is a blend of (1) a thermoplastic vinyl chloride resin free of plasticizer and selected from the group consisting of polyvinyl chloride and copolymers of vinyl chloride and propylene containing from about 0.5 to about 10%/wt. of combined propylene and (2) a rubbery essentially completely gelled polymer of a monomeric mixture free of conjugated unsaturation and comprising at least about 80% by weight of an alkyl acrylate in which the alkyl group contains from 2 to 4 carbon atoms, up to about 19.5% by weight of a monomer copolymerizable with said alkyl acrylate and containing a single $CH_2 = C<$ group per molecule, and from about 0.5 to about 8% by weight of a gel-inducing monomer copolymerizable with said alkyl acrylate and selected from the class consisting of (a) a monomeric acrylic polyester of a polyhydric alcohol and of an acrylic acid selected from the class consisting of acrylic and methacrylic acids and containing from 2 to 6 acrylic ester groups per polyester molecule and (b) a polyalkenyl polyether of a polyhydric alcohol containing from 2 to 6 alkenyl ether groups per molecule and in which the said alkenyl ether groups are each present in the structure $CH_2 = C<$, said acrylate polymer evidences a solubility in toluene at room temperature to the extent of less than 20%/wt. and is present in said blend as dispersed particles of average diameter between about 500 and about 8000 A, said thermoplastic resin exhibiting an inherent viscosity as determined at 30°C. according to ASTM D1243 employing 0.2 gram resin in 100 ml. of cyclohexanone, if polyvinyl chloride of between 0.45 and 1.20 and, if a copolymer of vinyl chloride and propylene of between 0.55 and 11.60 and said blend contains as polymeric ingredients from about 2% to about 20% by weight of said gelled acrylate polymer and from about 80% to about 98% by weight of said vinyl chloride resin.

8. A composition of claim 6 wherein the vinyl chloride polymer comprises macro-granules produced by polymerization in aqueous suspension, which granules consist of a (1) matrix of a hard, thermoplastic vinyl chloride resin selected from the class consisting of polyvinyl chloride and copolymers of from about 93% to about 99%/wt. of combined vinyl chloride and from about 1 to about 7%/wt. of combined propylene and (2) particles from about 1500 to about 8000A in average diameter dispersed uniformly in said matrix and consisting of a tough, rubbery, essentially completely-gelled copolymer of a monomeric material consisting of (a) an alkyl acrylate in which the alkyl group contains from 2 to 4 carbon atoms and (b) from about 1% to about 4%/wt. of a monomeric acrylic polyester of a polyalkylene glycol and of acrylic acid containing from 2 to 6 acrylate ester groups per polyester molecule, which rubbery copolymer exhibits a solubility in toluene at room temperature below about 10%/wt. and constitutes from about 5 to about 20 %/wt. of said composite product, the resulting composite resinous polymerization product being a rigid material possessed of high resistance to impact.

9. A composition of claim 6 wherein said vinyl chloride polymer comprises a polymerization product of (1) a vinyl chloride latex seed resin containing vinyl chloride latex seed resin particles from about 200 A to about 1250 A in average diameter as determined by means of a soap titration procedure, said seed resin latex having been prepared by polymerization in aqueous dispersion of a monomeric material consisting of liquid monomeric vinyl chloride, optionally not more than about 20%/wt. of said total monomeric material of one or more monovinylidene monomers copolymerizable in aqueous dispersion with vinyl chloride, and optionally from about 0.25% to about 5%/wt. of a crosslinking monomer free of conjugated unsaturation and containing at least two $Ch_2 = C<$ groups per molecule which demonstrate differen reactivities in polymerization with vinyl chloride, combined with 2 a. a monomeric mixture free of conjugated unsaturation and consisting of (i) at least 80%/wt. of an alkyl acrylate in which the alkyl groups contain from 2 to 8 carbon atoms, (ii) not more than a total of 19.5%/wt. of one or more monovinylidene monomers copolymerizable in aqueous dispersion with said alkyl acrylate, and (iii) from about 0.5% to about 8%/wt. of a crosslinking monomer containing at least two $CH_2 = C<$ groups per molecule;

b. selected polymerization adjuvents, if necessary, including a water-soluble peroxygen catalyst and one or more water-soluble dispersants both in proportions to effect polymerization of said monomeric mixture (a) in aqueous dispersion on said seed resin particles without significant new particle initiation; and (c) water, if required, the resulting aqueous dispersion medium containing no significant proportions of chain-terminating polymerization modifiers, and effecting polymerization of said monomeric mixture in said medium to form a latex product in which the original seed resin latex particles are coated with a shell of the resulting rubbery gelled acrylate copolymer ranging from about 50 A to about 700 A in thickness as determined by calculation based on a soap titration procedure, the said rubbery acrylate copolymer of said shell being soluble in toluene at room temperature to the extent of less than about 20%/wt. as determined by an ultra-centrifuge procedure, the material of said shell constituting from about 12% to about 99.7%/wt. of the total weight of said coated particles, 3 a. a combination of said step (2) rubber-coated latex particles with
  a. a monomeric material consisting of liquid monomeric vinyl chloride and not more than a total of 10%/wt. of one or more monovinylidene monomers copolymerizable with vinyl chloride in aqueous suspension, and, if necessary,
  b. a peroxygen polymerization catalyst;
  c. a polymerization suspension or dispersing agent; and
  d. water, 4. polymerization of said step (3a) monomeric material in the resulting aqueous medium to produce a polymeric product containing said rubbery acrylate coated latex particles encased in a matrix of hard, vinyl chloride resin, said last-named plymeric product containing from about 3 to about 65%/wt. of its total weight of aid rubbery, gelled acrylate copolymer.

10. A composite of claim 9 wherein the polymer of step (4) contains as a diluent a vinyl chloride resin and the final average concentration of polyacrylate is from about 3 to about 6 phr.

* * * * *